United States Patent [19]

Boström

[11] Patent Number: 4,905,480
[45] Date of Patent: Mar. 6, 1990

[54] DRAINING DEVICE AND THE USE THEREOF

[75] Inventor: Roland Boström, Enköping, Sweden

[73] Assignee: ABL Alpin Produkter, Enköping, Sweden

[21] Appl. No.: 267,127
[22] PCT Filed: Feb. 26, 1988
[86] PCT No.: PCT/SE88/00085
§ 371 Date: Oct. 28, 1988
§ 102(e) Date: Oct. 28, 1988
[87] PCT Pub. No.: WO88/06701
PCT Pub. Date: Sep. 7, 1988

[30] Foreign Application Priority Data

Mar. 2, 1987 [SE] Sweden .............................. 8700866

[51] Int. Cl.$^4$ ............................................. F28D 5/00
[52] U.S. Cl. ........................................ 62/310; 62/304
[58] Field of Search ................... 62/304, 309, 311, 310

[56] References Cited
FOREIGN PATENT DOCUMENTS 1526980 8/1969 Fed. Rep. of Germany .

Primary Examiner—Henry Bennett
Attorney, Agent, or Firm—Bacon & Thomas

[57] ABSTRACT

A draining device for the removal of excess liquid in devices of the type wherein liquid is pumped from a liquid supply (8) to a location of use and excess liquid is collected and removed periodically, comprises at least one draining conduit (14, 14a) connected to the suction conduit (9) between the liquid supply (8) and the location of use. A valve (15, 16, 28a), keeps the or each draining conduit (14) closed when the amount of collected excess liquid is below a preselected limit value, the location of use then being supplied with liquid only form the liquid supply (8). The or each valve (15, 16, 28a) opens the corresponding draining conduit (14) when the amount of collected excess liquid exceeds the limit value so as to re-circulate the collected excess liquid to the location of use. The draining device is preferably used in a cooling unit for cooling air by means of evaporation of water, and the invention also comprises a device for cooling air by evaporation of a liquid in a surface-enlarged evaporation block (6) comprising said draining device.

8 Claims, 3 Drawing Sheets

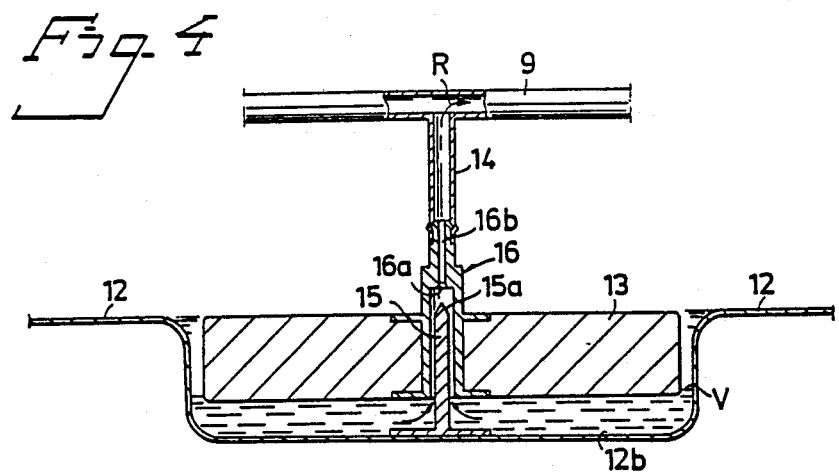
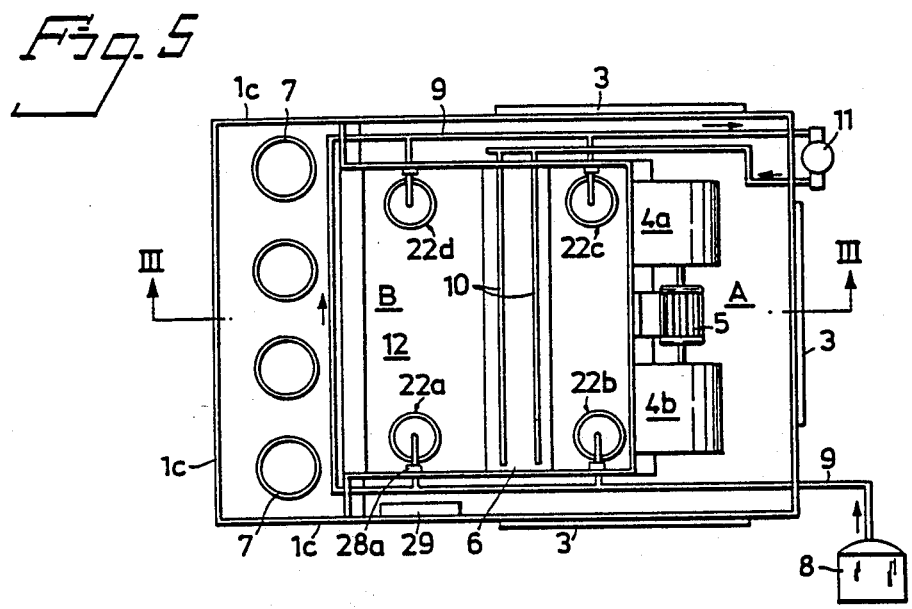
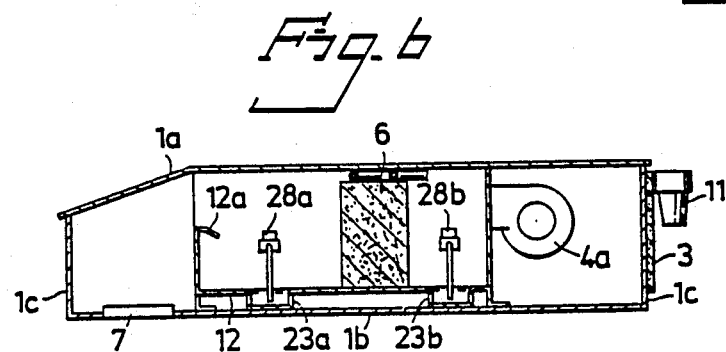

ically controlled valve device, which is controlled automatically by the amount of excess water.

DRAINING DEVICE AND THE USE THEREOF

TECHNICAL FIELD

The present invention relates to removal of excess liquid produced in devices of the type, wherein a liquid is pumped from a liquid to a location of use, the excess liquid being collected and removed periodically, especially for re-use. The invention is especially, but not exclusively, concerned with the removal of excess water produced in cooling devices having an air-permeable evaporation block which is continuously sprinkled with water and through which air flows continuously, the air being cooled, i.e. loosing heat by evaporating the water and excess water being collected for re-circulation An especially preferred field of use of the invention is in cooling units for cooling the supply air to the driving compartment in construction machinery and other mobile work places.

BACKGROUND OF THE INVENTION

In construction machinery and other vehicles serving as the work place of drivers and/or other operators the air conditioning has to be very efficient, especially during the warm season. Cooling units based on the use of halogenated hydrocarbons such as freon as the cooling agent, are today used in the majority of such work places. These units are often efficient and relatively compact in size, but they suffer from the severe drawback that this type of cooling agent is a danger to the environment, i.a. due to the unfavourable effect on the ozon layer of the earth.

There is thus a great need of alternative cooling units using environment-positive cooling agents. A known alternative is to make use of the evaporation of water for cooling the supply air to the driving compartment in construction machinery, the air being passed through an evaporation block having an enlarged surface area and being charged with water, the water being evaporated in said block while cooling the air. Such surface-enlarged evaporation blocks are known per se, e.g. being formed by a lattice of moisture-resistent cardboard (e.g. CELDEK C-5090-15, available from Munthers Svenska Försäljnings AB, Sollentuna, Sweden).

However, the known cooling units of this type have certain drawbacks and have only been used to a limited extent. As is obvious, they have a continuous demand of "cooling agent", i.e. of water to be evaporated, and the evaporation block normaly has to be kept supersaturated with water; in practice this means that excess water accumulates under the cooling unit. The previously known cooling devices have not solved the problem of handling the excess water in a satisfactory manner; this has i.a. resulted in a high water consumption, requiring oversized water tanks, and splashing of excess water into the driving compartment, especially when the vehicle slants when e.g. going downhill.

OBJECTS OF THE INVENTION

It is an object of the invention to provide for efficient removal of excess liquid, and reduced consumption of liquid, in devices of the type, in which a liquid is pumped from a liquid supply to a location of use and excess of the used liquid is collected and removed periodically, especially for re-use.

It is a special object of the invention to efficiently take care of the excess water in water-based cooling units and to prevent excess water from being carried with the cooled air to the location of use. It is another special object of the invention to make possible periodical re-use of the excess water using a special valve device, which is controlled automatically by the amount of excess water.

SUMMARY OF THE INVENTION

The special characteristics of the invention are indicated in the enclosed claims and will be further explained in the following description of preferred embodiments with reference to the enclosed drawings.

SHORT DESCRIPTION OF THE DRAWINGS

FIG. 4 is a view corresponding to FIG. 3 but with the draining valve in the open position.

FIG. 5 is a top plan view of a second embodiment of the cooling unit according to the invention.

FIG. 6 is a sectional view taken at III—III in FIG. 5.

DESCRIPTION OF PREFERRED EMBODIMENTS

Figure 1:
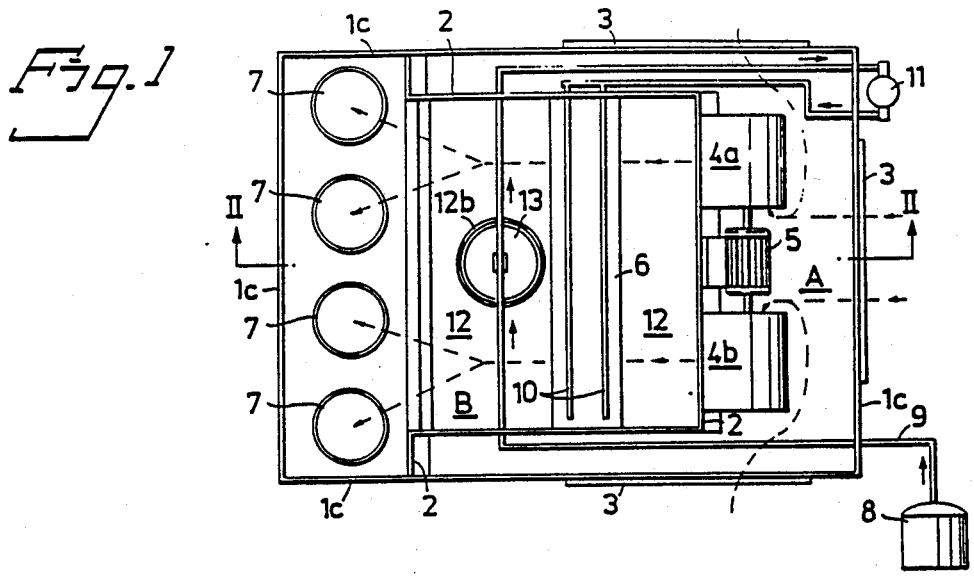
FIG. 1 is a top plan view of a first embodiment of a cooling unit according to the invention.
Figure 2:
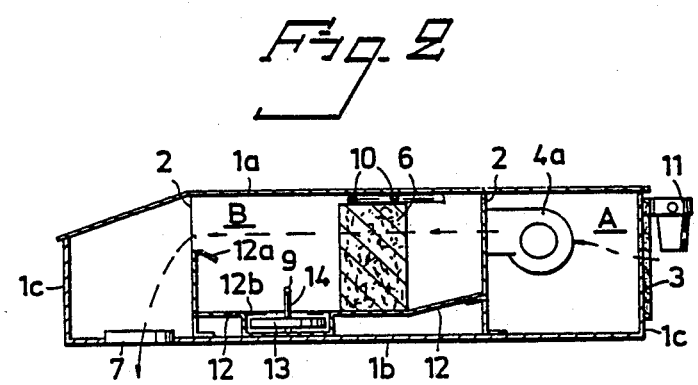
FIG. 2 is a sectional view taken along II—II in FIG. 1.

The cooling unit shown in FIGS. 1 and 2 is housed in a cover comprising a top plate 1a, a bottom plate 1b and side plates 1c. A partition 2 divides the space inside the cover into a negative pressure side A och a positive pressure side B. Three intake air filters 3 are provided in corresponding apertures in the side plate 1c on the negative pressure side A. Two fans 4a and 4b, which are driven by a common motor 5, draw the air through the air filters 3 and advance it through an evaporation block 6 on the positive pressure side B of the cooling unit. The air is cooled in the evaporation block 6 by evaporating liquid contained therein, and it is then advanced to the location of use through suitable, preferably adjustable valves 7, of which there are four in the shown embodiment. The flow paths of the air through the unit are illustrated schematically by the dashed arrows in FIGS. 1 and 2.

The evaporation unit 6 (e.g. of the CELDEK type, available from Munthers Svenska Försäljnings AB, Sollentuna, Sweden) is primarily supplied with liquid from a supply 8, e.g. a water tank, provided at a suitable location. A feed conduit 9 interconnects the water tank 8 with two spreader tubes 10 arranged above the evaporation block 6. The spreader tubes 10 preferably discharge the water through a multitude of small apertures (not shown) distributed along the tubes 10, so that the water hits the block 6 as "showers" of comparatively small droplets. The transport of water from the tank 8 is taken care of by a pump 11 in the conduit 9.

The basic function of the shown construction is to pump water from the tank 8 through the spray nozzles 10 to soak the block 6 with water. At the same time the fans 4a and 4b suck air through the intake air filters 3 to force the air through the open cells of the evaporation block 6. The heat necessary for evaporating the water contained in the block 6 is delivered by the air. The cooled air is then passed on to the location of use, for example to the driving compartment of a construction vehicle, through the control valves 7; the flow of air can be adjusted and lined up by means of control members (not shown) of the valves 7.

The excess water from the evaporation block 6 accumulates on an impervious bottom 12 provided under and around the block 6. On the outlet side the bottom is preferably pulled up and bent to form a splash guard 12a, which assists in preventing excess water from splashing and being drawn to the location of use by the cooled air.

In the bottom 12 there is provided a cup-shaped depression 12b, in which there is a floating body 13 having substantially the same shape as the depression 12b but somewhat smaller dimensions. A draining conduit 14 interconnects the depression 12b with the feed water conduit 9 at a location between the tank 8 and the pump 11. The function of the floating body is to periodically connect the draining conduit 14 with the conduit 9 for removal and re-use of the excess water accumulated in the depression 12b, as will be explained further with reference to FIGS. 3 and 4.

Figure 3:
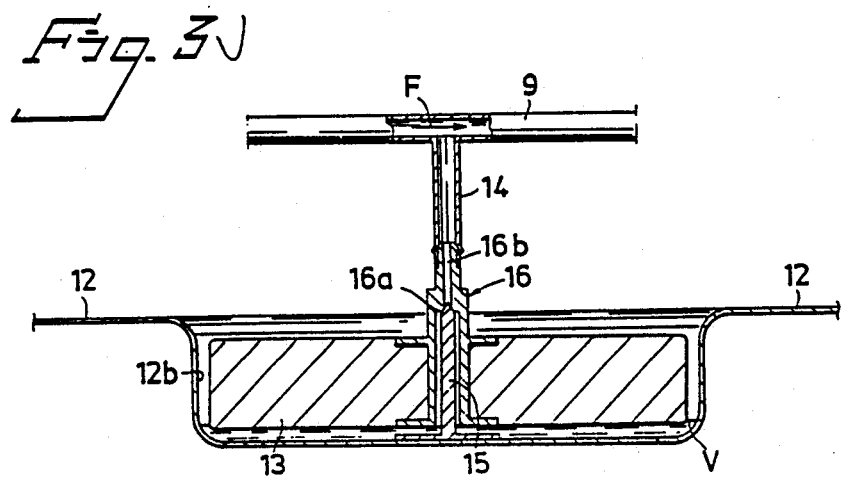
FIG. 3 is a sectional view of a first embodiment of a draining valve according to the invention shown in the closed position.

As can be seen from FIGS. 3 and 4 a valve body 15 is attached to the bottom of the depression 12b, substantially at the center thereof. The central portion of the floating body 13 is provided with a matching valve member 16, the valve seat 16a of which cooperates with the tip 15a of the valve body 15. In the valve member 16 there is a duct 16b, which interconnects the valve seat opening 16a with the draining conduit 14. The valve body 15 is thus stationary with regard to the bottom 12 and its depression 12b and is consequently independent of the level V of the excess water. On the other hand, the valve member 16 and its seat 16a are movable in relation to the bottom 12/the depression 12b—and consequently in relation to the valve body 15—depending on the water level V. In this manner the valve 15, 16 can keep the draining conduit 14 closed (FIG. 3) or open (FIG. 4), depending on the water level V.

In the position shown in FIG. 3 the water level V in the depression 12b is so low that the valve body 15 sealingly contacts the valve seat 16a. The evaporation block 6 will then be supplied with water only from the tank 8, as indicated by the arrow F in the conduit 9 in FIG. 3. As the water level V rises in the depression 12b, the floating body 13 rises progressively until the valve 15, 16 opens the draining conduit 14 when the water level V exceeds a pre-selected value. In this open position, which is illustrated in FIG. 4, excess water is sucked off from the depression 12b, through the valve 15, 16 and the draining conduit 14 and through the feed conduit 9 to the evaporation block 6 for re-use, as indicated by the arrow R. Because the draining conduit 14 is connected to the feed conduit 9 between the pump 11 and the tank 8, water will normally not be taken from the tank 8 as long as the valve 15, 16 is open. When the major part of the excess water has been sucked off, the valve 15, 16 closes automatically because the floating body 14 has sunk to the starting position; the pump 11 returns to pumping water form the tank 8 as in FIG. 3, whereupon the cycle is repeated, and so on.

The suspension of the valve element 16 with its associated floating body 13 can be varied in many ways, but it has been found to be especially advantageous to arrange the suspension so as to make the floating body 13 perform at last a restricted gyratory movement under the action of gravity, especially when it is desirable not to pump water to the evaporation block 6 when a vehicle, which is equipped with the device, slants strongly e.g. when going downhill. In such a case the floating body 13 will be inclined in relation to the bottom 12 by gravity, thereby keeping the valve 15, 16 open substantially independently of the water level V; the pump 11 will then substantially only suck air through the draining conduit 14 instead of water from the tank 8. (A prerequisite therefore is, of course, that the pump 11 can stand pumping air.) The valve 15, 16 and the floating body 13 can suitably be so arranged, that the valve opens to let air through at an inclination of the vehicle of the order of 15°–20°.

In the embodiment illustrated in FIGS. 5 to 8 corresponding elements are indicated by the same reference numerals as in the embodiment shown in FIGS. 1 to 4. Thus, also the second embodiment of the cooling unit comprises a cover 1a–1c, a partition 2 dividing the cooling device into a negative pressure side A and a positive pressure side B, filters 3 for the inlet air, airfans 4a, 4b driven by a motor 5, an evaporation block 6 being charged with water from a water tank 8 by means of a pump 11, a feed conduit 9 and spreader tubes 10, excess water being collected on an impervious bottom 12 comprising a splash guard 12a.

Instead of having only one central discharge valve 15, 16, the cooling unit shown in FIGS. 5 to 8 comprises several separate off-center discharge valve units 22a–22d, preferably four such valve units arranged symmetrically in relation to the center of the excess water collecting area formed by the impervious bottom 12. Although only the valve unit 22a, shown in FIGS. 7 and 8, will be described in more detail, it should be understood that valve units 22b to 22d are of similar design.

Figure 7:
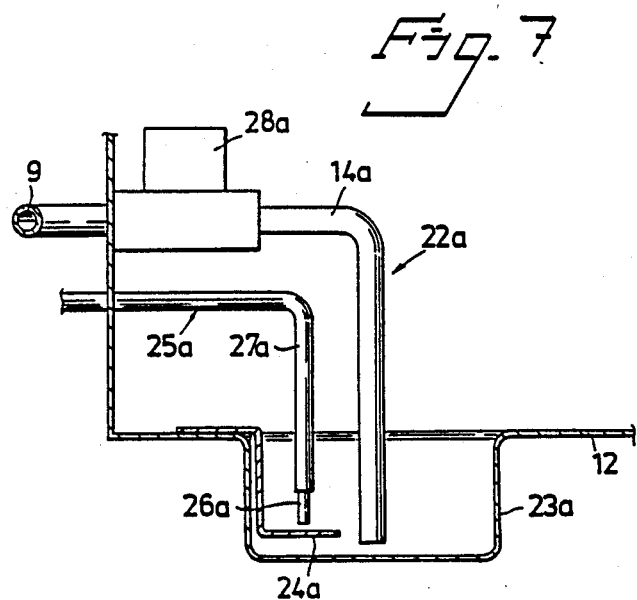
FIGS. 7 and 8 are sectional views corresponding to FIGS. 3 and 4 respectively but illustrating a second embodiment of a draining valve according to the invention.
Figure 8:
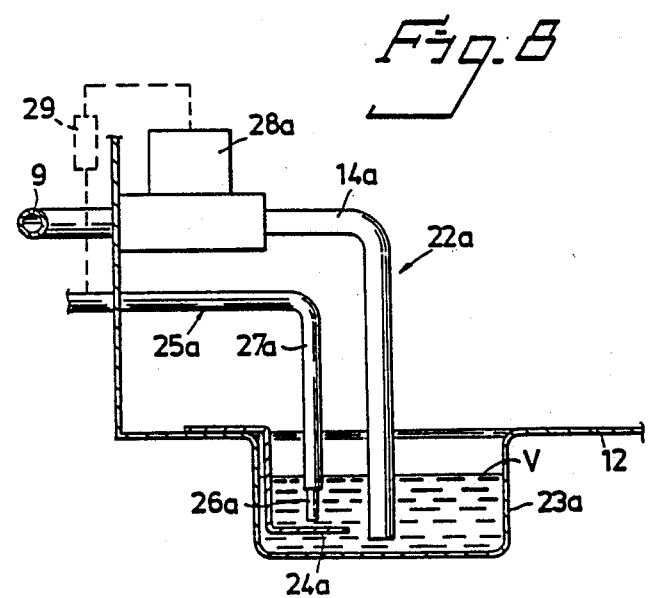

As shown in FIGS. 7 and 8 valve unit 22a cooperates with a water-collecting cup-shaped depression 23a provided in the bottom 12. An electrode (earth plate) 24a extends into the depression 23a at a selected level therein. A suction or draining conduit 14a, corresponding to conduit 14 in FIGS. 3 and 4, opens into the depression 23a near the bottom thereof. As in the previously described embodiment, the opposite end of the conduit 14a is connected to the feed conduit 9. An electrically or magnetically controlled valve 28a, such as a solenoid valve, is provided in the conduit 14a and is arranged to open and close said conduit in response to signals received form a control unit 29. An electric cable 25a comprising a central electrical conductor 26a and a surrounding insulation 25a has one end of the conductor 26a connected to the control unit 29 and the other end depending into the depression 23a. The conductor 26a ends at a certain distance from the earthed electrode 24a, said distance preferably being adjustable.

Each of the valve units 22a to 22d basically have the same function as the single valve 15, 16 shown in FIGS. 3 and 4, viz. to keep the conduit 14a closed when the level V of excess water in the respective depression 23a is lower than a preselected value, and to open said conduit when said level V exceeds the preselected value, thereby allowing excess water to be discharged to feed conduit 9 for re-use in the evaporation block 6. By providing individually controlled draining valves in the "four corners" of the excess water collecting space, an efficient and rapid draining effect is obtained in response to changed inclination of the vehicle, acceleration or retardation thereof, or similar conditions causing excess water to move around in the collecting 12, 23a.

The solenoid valve 28a is conrolled by the water level V as follows: When the water level does not reach the end of the conductor 26b there is an air gap between the earthed electrode 24a and the conductor 26a. In this position there is no need to drain excess water, so the solenoid valve 28a is closed, and no signal is recorded in the control unit 29. When the water level V reaches the conductor 26a, the electrical resistance between the conductor 26a and the earthed electrode 24a will change, and this new condition will be detected by the control unit 29, who will send an opening signal to the valve 28a. The valve is kept open until the water level V falls below conductor end 26a, again leaving an air gap between the conductor 26a and the earthed electrode 24a. This change of condition is detected by control unit 29, which sends a closing signal to solenoid valve 28a. Such control functions and control units are known per se and will not be described further herein.

The invention is, of course, not restricted to the embodiments which have been described above and are shown in the drawings, but many variations and modifications are possible within the scope of the appended claims.

I claim:

1. A device for cooling air by evaporation of a liquid, comprising
   (a) a surface-enlarged evaporation block (6),
   (b) means (9) feeding liquid from a liquid supply (8) to the evaporation block (6) and to soak the same with the liquid,
   (c) means (4a, 4b) for feeding the air to be cooled through the evaporation block (6),
   (d) means (12, 12b) for collecting excess liquid from the evaporation block (6),
   characterized in that at least one draining conduit (14) interconnects the collecting means (12, 12b, 23a) with the feed conduit (9) from the liquid supply (8) to the evaporation block (6) at a point between the liquid supply (8) and pumping means (11), which pump liquid to the evaporation block (6), and in that the or each draining conduit (14) is provided with a normally closed valve means (15, 16, 28a), which is arranged to open the draining conduit (14) when the level of liquid in the collecting means (12, 12b, 23a) exceeds a preselected limit value, so that the pumping means (11) pumps excess water from the collecting means (12, 12b, 23a) to the evaporation block (6) for re-use.

2. A device according to claim 1, characterized in that the means for soaking the evaporation block (6) with liquid comprises at least one spreader tube (10) arranged above the block (6) and provided with a great number of small nozzle openings sprinkling water as fine droplets substantially uniformly over the entire top surface of the block (6).

3. A device according to claim 1 for use in construction machinery or similar vehicles, characterized in that the or each valve means (15, 16, 28a) is arranged to open to let air into said draining conduit (14, 14a) when the inclination of the vehicle exceeds about 15°.

4. A device according to claim 1, characterized in that it comprises at least two draining conduits (14a) and an independently controlled draining valve (28a) for each draining conduit (14a).

5. A device according to claim 4, characterized in that the or each draining valve (15, 16; 28a) is independently controlled by means (13; 24a, 25a, 28a, 29) for detecting the level (V) of exces water and opening or closing the corresponding draining valve in response to the detected excess water level (V).

6. A device according to claim 1, characterized in that the or each valve means comprises a movable valve member in the form of a floating body (13) floating on the collected excess liquid and cooperating with a stationary valve member (15), which is independent of the level of the excess liquid, so as to open and close respectively said draining conduit (14) depending on the position of the floating body.

7. A device according to claim 6, characterized in that the floating body (13) is arranged in a cup-shaped depression (12b) being filled with excess liquid, and in that the stationary valve member comprises a valve body (15a), which is attached to the bottom (12b) of the depression and cooperates with a corresponding valve seat (16a) on the floating body (13).

8. A device according to claim 1, characterized in that the or each means for detecting the level (V) of excess water and controlling said draining valve (28) comprises a reference electrode (24a) spaced apart from an electrical conductor (26a) and means (29) for detecting the electrical resistance between said electrode (24a) and said electrical conductor (26a).

* * * * *